United States Patent
Rao et al.

(10) Patent No.: US 7,562,810 B2
(45) Date of Patent: Jul. 21, 2009

(54) METHOD AND SYSTEM FOR ENABLING MULTIPLE PAYMENT OPTIONS IN LOYALTY PROGRAM TRANSACTIONS

(75) Inventors: Machiraju Rama Rao, Hyderabad (IN); Bontha Murthy, Visakhapalnam (IN); Lalitha Dandibotla, Hyderabad (IN); Javid Sheik, Kurnool (IN); Siju Narayan, Hyderabad (IN); Shyam Shah, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 11/463,885

(22) Filed: Aug. 10, 2006

(65) Prior Publication Data

US 2008/0023540 A1    Jan. 31, 2008

(51) Int. Cl.
    *G06F 17/00* (2006.01)
(52) U.S. Cl. ...................... 235/375; 235/380
(58) Field of Classification Search ................ 235/380, 235/375; 705/14
    See application file for complete search history.

(56) References Cited

U.S. PATENT DOCUMENTS

| | | | |
|---|---|---|---|
| 5,969,974 A * | 10/1999 | Vandenbelt et al. ......... 708/105 |
| 6,138,911 A * | 10/2000 | Fredregill et al. ........... 235/383 |
| 7,099,803 B1 | 8/2006 | Rappoport et al. |
| 7,134,087 B2 * | 11/2006 | Bushold et al. ............. 715/764 |
| 2001/0037241 A1 * | 11/2001 | Puri ............................. 705/14 |
| 2001/0054003 A1 * | 12/2001 | Chien et al. .................. 705/14 |
| 2002/0026348 A1 | 2/2002 | Fowler et al. |
| 2002/0059103 A1 | 5/2002 | Anderson et al. |
| 2002/0174011 A1 | 11/2002 | Sanchez et al. |
| 2003/0200141 A1 | 10/2003 | Robison |
| 2003/0229541 A1 | 12/2003 | Randall et al. |
| 2005/0240472 A1 * | 10/2005 | Postrel ......................... 705/14 |
| 2006/0031120 A1 | 2/2006 | Roehr et al. |
| 2006/0111978 A1 | 5/2006 | Tietzen et al. |
| 2006/0161478 A1 * | 7/2006 | Turner et al. .................. 705/14 |
| 2006/0178986 A1 | 8/2006 | Giordano et al. |
| 2006/0248007 A1 * | 11/2006 | Hofer et al. ................... 705/40 |
| 2008/0021772 A1 | 1/2008 | Aloni et al. |
| 2008/0077498 A1 | 3/2008 | Ariff et al. |
| 2008/0077499 A1 | 3/2008 | Ariff et al. |

* cited by examiner

*Primary Examiner*—Daniel A Hess
*Assistant Examiner*—Paultep Savusdiphol
(74) *Attorney, Agent, or Firm*—Townsend and Townsend and Crew LLP

(57) ABSTRACT

The present invention discloses a method and system for enabling multiple payment options for members in a loyalty program. The method according to the present invention includes the steps of receiving a request for a loyalty service and capturing service information and payment options of interest from the members, and processing the service information and payment options and displaying a set of feasible payment options to the members. The present invention enables members to exercise any payment option of choice, which includes loyalty units, monetary currencies and a combination of loyalty units and monetary currencies.

14 Claims, 3 Drawing Sheets

METHOD AND SYSTEM FOR ENABLING MULTIPLE PAYMENT OPTIONS IN LOYALTY PROGRAM TRANSACTIONS

BACKGROUND OF THE INVENTION

1. Field of the Invention

The present invention generally relates to a customer loyalty program and, in particular, to a method and system for enabling multiple payment options in loyalty transactions.

2. Description of Related Art

Customer loyalty programs were introduced by airlines, hotels, and rental cars etc. to retain their customers as well as to attract new customers. In many of these programs, a customer earns loyalty units (generally regarded as points, miles, etc) for undertaking some activity (E.g. taking flights on host airline or a partner airline or spending on a credit card of a card partner). The loyalty units which are earned in these programs can be redeemed for various goods and services offered as awards. The principle of a loyalty program is to retain an existing customer base as it is more expensive to bring in new customers than to retain existing ones.

The airline industry revolutionized the way customers were recognized for their loyalty by initiating customer loyalty programs. The central theme of these programs has been rewarding members (customers, who have enrolled in loyalty program) in some form of loyalty units for doing business with the airline or its loyalty program partners and thereby contributing to the revenue of the airline. Members are then allowed to purchase products and/or services on payment through the loyalty units they have earned.

The next generation loyalty programs would seek to reward loyalty based on the buying pattern of the members and thereby achieve meaningful distinction between members, based on various loyalty or business parameters. To elaborate the point above, for example an airline would like to reward its loyalty program members in 'points' for doing business with its non-air partners, in 'miles' for doing business with its air partners and in 'miles' and 'status credits' for doing business with itself Each type of loyalty unit earned by the member in the case above would then represent his buying pattern.

This would require the loyalty programs to have an ability to reward its members in different forms of loyalty units. This would also mean that the loyalty programs would need to offer multiple payment options in different loyalty units for products and/or services offered to the members for redemption. The complexity is further compounded with the practice of allowing part of the payment for redemption in monetary currency, should the member fall short of loyalty unit's balance. For example, if a redemption seat from Sydney (SYD) to Melbourne (MEL) costs 12,000 points and if the member has a balance of only 8,000 points, he can make payment in monetary currency (say 70 Australian Dollars) for the shortfall. The monetary currency used for payment of the shortfall may also vary based on member's preference. For example, an Australian may prefer to pay in AUD and a New Zealander may prefer to pay in New Zealand dollars (NZD). This would require airlines to have an ability to provide '(n+m)+(n×m)' type of payment options for products and/or services, it offers on redemption where, n=number of different types of loyalty units, loyalty program uses to reward the members of its loyalty program.

m=number of monetary currencies, loyalty program supports for receiving payment for redemption of products and/or services.

So if an airline uses three types of loyalty units to reward its members (points, miles and credits) and supports two monetary currencies (AUD and NZD), it would need an ability to offer 11 payment options for the members as redemption prices for the products and/or services. The different payment options are given as follows:

1. Points
2. Miles
3. Credits
4. AUD
5. NZD
6. Points+AUD
7. Miles+AUD
8. Credits+AUD
9. Points+NZD
10. Miles+NZD
11. Credits+NZD Currently, due to system limitations, members in a loyalty program are only provided limited choices in terms of loyalty units, monetary currencies and combination of both as payment options. Current methods provide a predefined and static pricing in loyalty transactions. The price lists cannot be dynamically fetched from monetary currencies and loyalty units to offer the members with multiple payment options according to their choices. The variability in pricing currently available in loyalty programs is limited to a fixed combination of loyalty units and monetary currency. This impacts airline's ability to reward the members in different types of loyalty units, thereby causing limitations in achieving its Customer Relationship Management (CRM) objectives. Consequently, there exists a need for a system and a method for enabling multiple payment options available to the members in loyalty program transactions.

SUMMARY OF THE INVENTION

In order to overcome the deficiencies of the prior art there is provided a method and a system for enabling multiple payment options available to the members in loyalty program transactions. According to the method of the present invention a member gets multiple payment option namely loyalty units, monetary currency and a combination of loyalty units and monetary currencies to avail flexibility to choose the mode of payment. Further, it allows members to be able to choose from an array of multiple loyalty units and multiple monetary currencies.

In an embodiment of the present invention, a method of enabling multiple payment options for members in a loyalty program is provided. The method includes the steps of receiving a request for a loyalty service, capturing service information and payment options of interest from the members, processing the service information and payment options, and displaying a set of feasible payment options to the members. Processing the service information and payment options further includes the steps of automatically selecting different price lists for selected loyalty unit and monetary currencies, providing a link between price lists in monetary currencies and loyalty units, pricing a product and/or service offered to the member based on pricing attributes, interpreting pricing outputs, and grouping the pricing outputs for displaying the set of feasible payment options to the members. The pricing outputs include separate prices in monetary currencies and/or loyalty units.

In another embodiment of the present invention, a system is provided for enabling multiple payment options for members in a loyalty program. The system includes an input module for receiving a request for a loyalty service, a capturing module for capturing service information and payment options of interest from the members, a processing module for processing service information and payment options, and an output module for displaying a set of multiple payment options available to the members. The system also includes a processing module for interpreting pricing outputs and grouping the pricing outputs, and an output module for displaying a set of multiple payment options available to the members.

The above summary of the present invention is not intended to describe each disclosed embodiment of the present invention. The figures and detailed description that follow provide additional aspects of the present invention.

BRIEF DESCRIPTION OF DRAWINGS

The invention may be more completely understood in consideration of the following detailed description of various embodiments of the invention in connection with the accompanying drawings, in which.

DETAILED DESCRIPTION OF DRAWINGS

The present invention discloses a method and system for enabling multiple payment options available to the members in loyalty program transactions. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
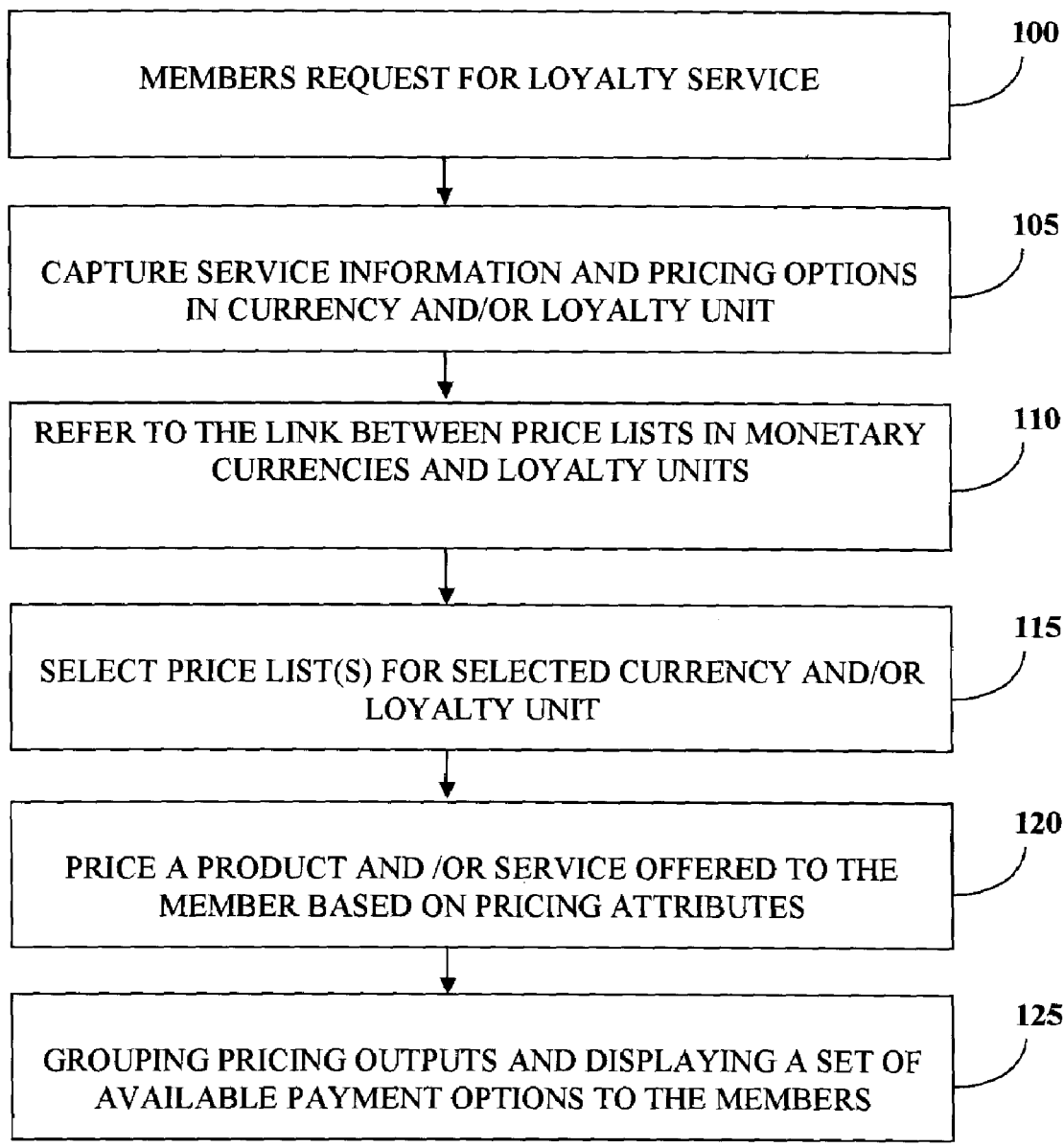
FIG. 1 is a flow diagram illustrating an embodiment of the method of enabling multiple payment options for members in loyalty transactions.

FIG. 1 is a flow diagram illustrating an embodiment of the method of enabling multiple payment options for members in loyalty transactions. A loyalty program includes loyalty units exchangeable with products and/or services offered to the members. When a member requests for a service and/or a product offered by the loyalty program 100, the service information and pricing options are captured by the system in monetary currency and/or loyalty units 105. One way of capturing service information includes members calling the service center where an agent captures the service information on the loyalty service screen and submits the request on behalf of the member. A member can also access the services through a third party system (provided by the loyalty operation) such as a website where they enter the service information and request the given service. At the time of requesting a service, a member is required to select a preferred payment option. The payment options available to the members include loyalty units, monetary currencies and a combination of loyalty units and monetary currencies. Members are enabled to choose the mode of payment including the currency of their choice.

There is a link provided between different price lists in monetary currency and loyalty units. After capturing the service information and pricing options, the system refers to the link provided between the different price lists in monetary currency and loyalty units 110. Different price lists are selected for monetary currency and/or loyalty units separately 115. A price list is a register for storing the prices of products or services that are available as offerings to the members. The price list includes one or more lines of price for the same or different products. At the time of requesting a product or service, a member is required to select the monetary currency and/or loyalty units by which he/she is opting to pay. This is used as an input parameter to select the appropriate price list(s). The service information required from the members varies from offering to offering and typically includes membership number, product or service requested, date of activity, quantity, mode of payment and partner associated with the product or service. The requested information along with other derived information such as tier of the member, location, partner category is used as input parameters to determine the price for each of the options that are made available to the member.

For example, if the product chosen by the member is '3days/2 nights stay at Hilton, London central', a member is presented with only loyalty units option and, other options viz. monetary currency only and monetary currency plus loyalty units are not available for the given request whereas, if the member chooses 'Replacement card' as the product, the options could be all the three viz. monetary currency, loyalty units and a combination of monetary currency plus loyalty units. Setting up price lists in one or more currencies and grouping the same (in case of points plus pay combination) brings this variability in payment options.

Once the price list is selected, an appropriate price is determined based on the member, transaction, product and partner attributes 120. This step also includes a decision on how many options the member gets for payment viz. monetary currency, loyalty units and a combination of monetary currency plus loyalty units. Pricing of a given service and/or product is explained through the following example. If the product requested is 3 Days/4 Nights stay at 'Holiday Inn' and the location is 'San Francisco' and the member's tier is 'Gold' and belongs to 'United States' then the member is given 10% discount on the list price. The member also has all the three payment options to choose viz. monetary currency, loyalty units and a combination of monetary plus loyalty units. These rules could be setup based on various pricing attributes, which are either provided by the member at the time of requesting the service (such as the product or service, date of activity, quantity etc.) or could be derived such as tier of the member (based on the membership number etc.), country of residence, partner location (based on the product or service requested), partner category (hotel, car rental etc.)

When a member gets the option of paying some part of the amount for a product and/or service in loyalty units and some in monetary currency, two price lists are setup (one in loyalty unit and the other in monetary currency). In the setup, these two price lists are grouped together (and there can be many such groups of price lists representing different combinations of loyalty units and monetary currencies). At the time of pricing, each price list (one in loyalty units and other in monetary currency) returns a price based on various pricing attributes such as tier of the member, product or service, dates etc. These two prices are grouped together to present the option of points plus pay 125. Once this option is displayed, if members fall short, they choose another option (if it is available). The loyalty program product takes cognizance of member's miles balance and accordingly presents an option, which is suitable to the member. For example, if one member has 20,000 miles and another member has 30,000 miles, according to the method of the present invention, first member can be presented with 20,000 miles plus 30USD option and the second member can be presented with 30,000 miles and 20USD option.

Figure 2:
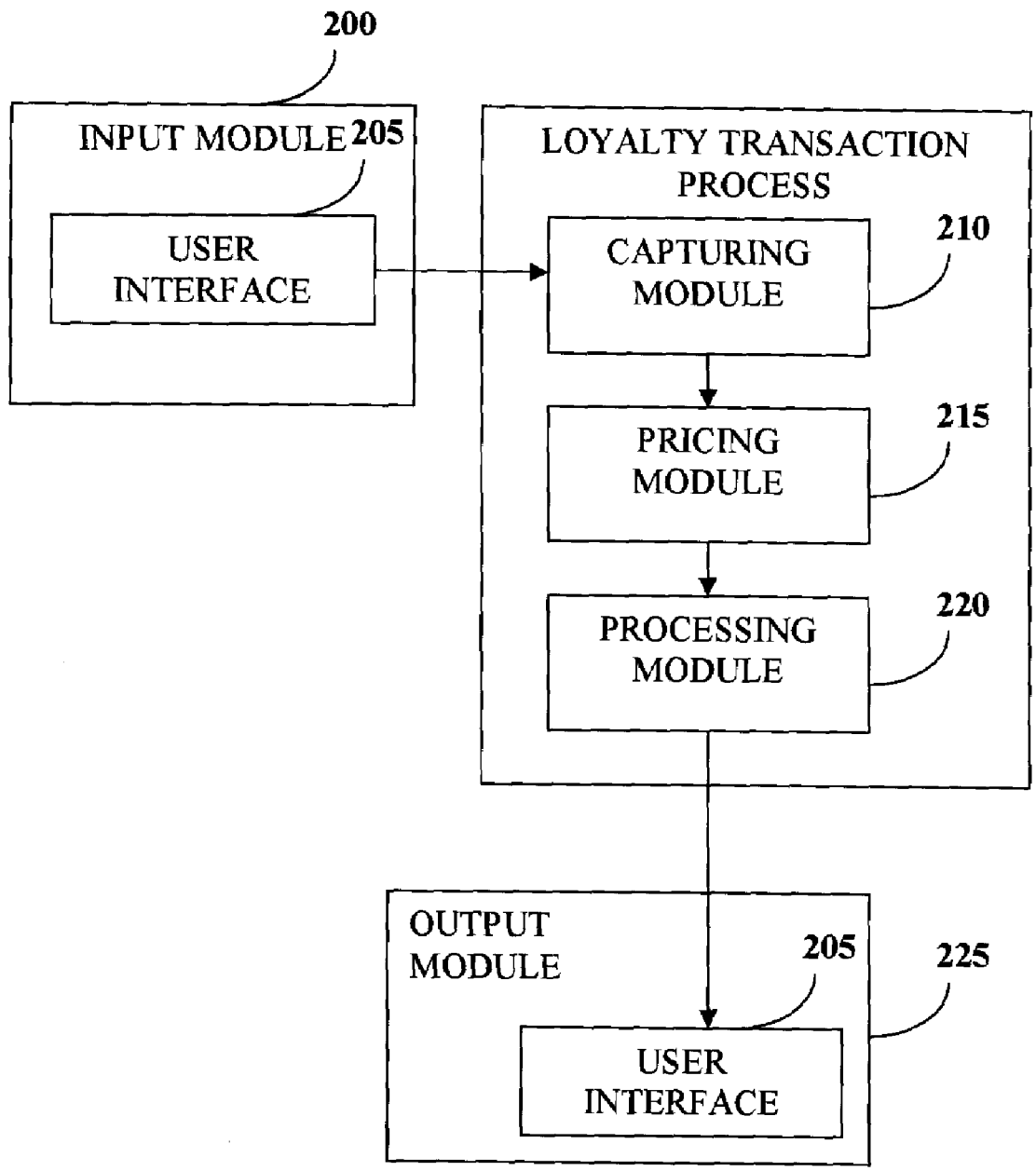
FIG. 2 is a block diagram illustrating components of the loyalty transaction system for enabling multiple payment options for members in loyalty transactions.

FIG. 2 is a block diagram illustrating components of the loyalty transaction system for enabling multiple payment options for members in loyalty transactions. The loyalty transaction system includes an input module 200, a user interface 205, a capturing module 210, a pricing module 215, a processing module 220, and an output module 225. The input module 200 includes a user interface 205 for members to interact with the loyalty processing system. Members are able to log into a third-party system (or a website provided by the loyalty program) where they input the service information and request for an offered service and/or product. The service information and pricing options as selected by members are captured by a capturing module 210.

After capturing the service information and pricing options, different price lists are selected for monetary currency and loyalty units separately. This is executed by the pricing module 215. Once the price list is selected, an appropriate price is determined based on member, transaction, product and partner attributes by the processing module 220. When a member opts to pay some part in loyalty units and some in monetary currency, price lists set-up for the given points+pay combination are referred to return a price based on various pricing attributes such as tier of the member, product or service, dates etc. These two prices are grouped together to present the option of points plus pay in the processing module 220. Processing module 220 determines how many payment options are presented to members viz. monetary currency, loyalty units and a combination of monetary currency plus loyalty units. The feasible set of payment options is displayed to the members through an output module 225. The output module 225 further includes a user interface 205. The members are enabled to view and select from the different payment options displayed.

Figure 3:
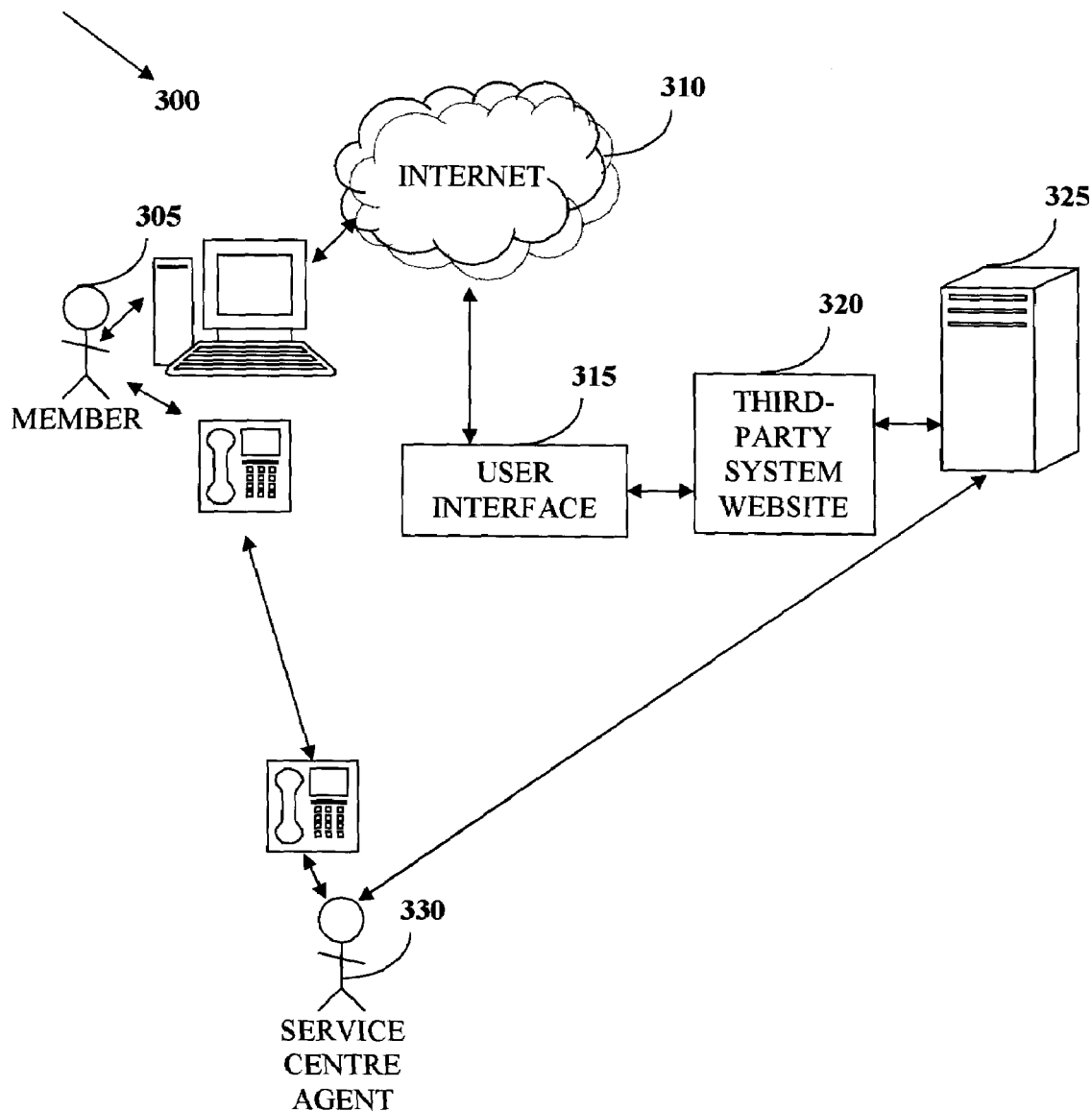
FIG. 3 illustrates an overview of an embodiment of the system for enabling multiple payment options for members in loyalty transactions.

FIG. 3 illustrates an overview of an embodiment of the system for enabling multiple payment options for members 305 in loyalty transactions 300. A member 305 requests for a product and/or service offered by the loyalty program. The service information and pricing options are captured from the member 305. The member 305 logs into a third-party system website 320 (provided by loyalty program) through internet 310 and enter the service information. There is an interactive user interface 315 provided on the third-party system website 320. Alternatively, member 305 calls a service centre agent 330 and the service centre agent 330 submits the service information on behalf of the member 305 to the loyalty transaction system 325. The loyalty transaction system 325 has the member information (member identity, tier information etc.) stored in its database. Based on the pricing attributes a product and/or a service are priced and various payment options are displayed to the member 305. The member 305 then chooses the convenient payment option and makes the payment.

The method and system according to the present invention finds its application in customer loyalty programs. The customer loyalty programs include, but not limited to loyalty programs in airlines, hotels car renting agencies etc. However, those skilled in the art will find the applications in any payment transactions where there is a need for a multiple payment option.

The invention claimed is:

1. A method for enabling multiple payment options for members in a loyalty program, the method comprising:
   receiving a request for a loyalty service;
   capturing service information and payment options of interest from a member, the payment options of interest comprising payment in combination of loyalty units and any of a plurality of monetary currencies issued by different countries;
   processing said service information and payment options of interest, wherein processing said service information and payment options of interest comprises determining, at a computer system, one or more price lists corresponding to the service information and payment options of interest;
   determining that a plurality of payment options are available to the member;
   calculating, for each of the plurality of payment options, a price for the loyalty service in one of the plurality of monetary currencies;
   displaying a set of available payment options available to the member, wherein the displayed set of payment options comprises the calculated price in one of the monetary currencies for the loyalty service; and
   receiving, via a user interface, a selection of one of the payment options.

2. The method of claim 1, wherein said capturing service information and payment options includes the member logging into a third-party system website provided by said loyalty program and entering the service information.

3. The method of claim 1, wherein said capturing service information and payment options includes the member calling a service centre agent and submitting the request, said service centre agent submitting the request to the loyalty program for the member.

4. The method of claim 1, wherein said processing the service information and payment options farther comprises:
   pricing a loyalty service offered to the member based on a set of pricing attributes, wherein said pricing comprises selecting several values for the same or different loyalty service;
   interpreting pricing outputs, wherein said pricing outputs comprise separate prices in monetary currencies and loyalty units; and
   grouping the pricing outputs for displaying said set of multiple payment options available to the member.

5. The method of claim 4, wherein said pricing attributes comprise member attributes, transaction attributes, product attributes and partner attributes.

6. The method of claim 4, wherein the pricing attributes are derived from membership of the member, geographical location, partner location and partner category.

7. The method of claim 1, wherein said processing the service information and payment options further comprises:
   selecting a plurality of price lists for the payment options; and
   providing a link between price lists of said loyalty service in the plurality of monetary currencies and loyalty units.

8. The method of claim 1, wherein the member is enabled to select a payment option of choice available from the displayed set of multiple payment options.

9. A system for enabling multiple payment options for members in a loyalty program, the system comprising:
   an input module for receiving a request for a loyalty service;
   a capturing module for capturing service information and payment options of interest from a member, said payment options of interest comprising payment in combination of loyalty units and any of a plurality of monetary currencies issued by different countries;

a pricing module for determining a price list corresponding to the service information and payment options of interest;

a processing module for processing said service information and payment options of interest, for determining that a plurality of payment options are available to the member, and for calculating, for each of the plurality of payment options, a price for the loyalty service in one of the plurality of monetary currencies; and an output module for displaying a set of the multiple payment options available to the member;

wherein the input module further receives a selection of one of the payment options.

10. The system as in claim 9, wherein said input module further comprises a user interface for entering the service information and requesting for a product and/or service offered by the loyalty program.

11. The system of claim 9 wherein:

the pricing module further comprises logic for generating a plurality of pricing outputs based on a plurality of pricing attributes for selected product and/or service separately in loyalty units and monetary currencies.

12. The system as in claim 11, wherein said pricing module further comprises a logic for interpreting said pricing outputs and grouping the pricing outputs.

13. The system as in claim 11, wherein said plurality of pricing attributes comprise member attributes, transaction attributes, product attributes and partner attributes.

14. The system as in claim 11, wherein the pricing attributes are derived from membership of the member, geographical location, partner location and partner category.

* * * * *

UNITED STATES PATENT AND TRADEMARK OFFICE
CERTIFICATE OF CORRECTION

PATENT NO. : 7,562,810 B2 Page 1 of 1
APPLICATION NO. : 11/463885
DATED : July 21, 2009
INVENTOR(S) : Machiraju Rama Rao et al.

It is certified that error appears in the above-identified patent and that said Letters Patent is hereby corrected as shown below:

On Title page, in field (75), in column 1, in "Inventors", line 2, delete "Visakhapalnam" and insert -- Visakhapatnam --, therefor.

Drawings
On sheet 1 of 3, in Figure 1, Box No. 120, line 1, delete "AND /OR" and insert -- AND/OR --, therefor.

In column 6, line 34, in claim 4, delete "farther" and insert -- further --, therefor.

Signed and Sealed this

Sixth Day of July, 2010

David J. Kappos
*Director of the United States Patent and Trademark Office*